United States Patent
Akca et al.

(10) Patent No.: US 11,536,071 B2
(45) Date of Patent: Dec. 27, 2022

(54) DAMPING UNIT AND HOME APPLIANCE WITH THE DAMPING UNIT

(71) Applicant: BSH HAUSGERAETE GMBH, Munich (DE)

(72) Inventors: Ali Akca, Tekirdag (TR); Christian Baumann, Sontheim-Brenz (DE); Muharrem Uemit Caglin, Istanbul (TR); Ercan Engin, Tekirdag (TR); Alfred Raab, Huettlingen (DE); Aydin Sahin, Istanbul (TR)

(73) Assignee: BSH Hausgeraete GmbH, Munich (DE)

( * ) Notice: Subject to any disclaimer, the term of this patent is extended or adjusted under 35 U.S.C. 154(b) by 591 days.

(21) Appl. No.: 16/590,610

(22) Filed: Oct. 2, 2019

(65) Prior Publication Data
US 2020/0115945 A1 Apr. 16, 2020

(30) Foreign Application Priority Data
Oct. 12, 2018 (TR) .................................. 2018/15157

(51) Int. Cl.
| E05F 5/02 | (2006.01) |
| E05F 5/10 | (2006.01) |
| F25D 23/02 | (2006.01) |

(52) U.S. Cl.
CPC ........... *E05F 5/10* (2013.01); *E05Y 2800/242* (2013.01); *E05Y 2900/31* (2013.01); *F25D 23/028* (2013.01)

(58) Field of Classification Search
CPC ........... E05Y 2800/242; E05Y 2800/21; E05Y 2800/22; E05Y 2900/20; E05Y 2900/30; E05Y 2900/31; E05Y 2900/308; E05Y 2900/304; E05Y 2900/306; E05Y 2900/312; E05Y 2201/24; E05Y 2201/212; Y10T 16/61; Y10T 16/625; Y10T 16/628; Y10T 16/6285; Y10T 16/629; E05F 5/00; E05F 5/02; E05F 5/022; E05F 5/003; E05F 5/06; E05F 5/08; E05F 5/10; A47B 2210/0018; B65G 69/001
See application file for complete search history.

(56) References Cited

U.S. PATENT DOCUMENTS

| 2,714,429 A * | 8/1955 | Etherton ............... F16F 9/3405 267/226 |
| 4,909,488 A | 3/1990 | Seibert et al. |
| 5,220,706 A * | 6/1993 | Bivens ..................... E05F 3/02 267/225 |

(Continued)

FOREIGN PATENT DOCUMENTS

| DE | 9210092 U1 | 9/1992 |
| DE | 102015013422 A1 | 4/2017 |

(Continued)

*Primary Examiner* — Chuck Y Mah
(74) *Attorney, Agent, or Firm* — Laurence A. Greenberg; Werner H. Stemer; Ralph E. Locher (57) ABSTRACT

A damping unit for damping a movable element of a home appliance has at least two dampers positioned in a housing. The dampers are positioned side-by-side to guarantee a defined series of damping an energy of the movable element. There is also described a home appliance having the novel damping unit.

19 Claims, 9 Drawing Sheets

(56) References Cited

U.S. PATENT DOCUMENTS

| | | | | |
|---|---|---|---|---|
| 7,677,347 B2* | 3/2010 | Brawn | ................... | B60G 17/06 |
| | | | | 180/227 |
| 7,784,890 B1* | 8/2010 | Chen | ........................ | F16F 9/22 |
| | | | | 312/334.44 |
| 8,047,343 B1 | 11/2011 | Chen | | |
| 8,621,713 B2* | 1/2014 | Zimmer | ................... | E05F 5/006 |
| | | | | 16/85 |
| 9,169,905 B1* | 10/2015 | Morris | .................... | E05F 15/60 |
| 2003/0213663 A1 | 11/2003 | Salice | | |
| 2006/0207843 A1* | 9/2006 | Migli | ...................... | F16F 9/3214 |
| | | | | 188/282.1 |
| 2006/0220284 A1* | 10/2006 | Holzapfel | ................ | E05F 5/10 |
| | | | | 267/124 |
| 2007/0157429 A1* | 7/2007 | Gallasch | ................ | E05F 5/006 |
| | | | | 16/238 |
| 2007/0251052 A1* | 11/2007 | Pyo | .......................... | E05F 5/02 |
| | | | | 16/86 A |
| 2008/0245630 A1* | 10/2008 | Le | .......................... | F16F 9/068 |
| | | | | 188/280 |
| 2009/0094789 A1* | 4/2009 | Bereznai | ................... | E05F 5/10 |
| | | | | 16/84 |
| 2009/0307869 A1* | 12/2009 | Salice | ................... | E05C 19/165 |
| | | | | 16/85 |
| 2010/0270114 A1* | 10/2010 | Herper | ..................... | E05F 5/10 |
| | | | | 188/283 |
| 2016/0108656 A1* | 4/2016 | Sugiura | ................. | E05F 1/1016 |
| | | | | 49/386 |
| 2016/0273777 A1* | 9/2016 | Kim | ...................... | E05F 5/02 |
| 2019/0383081 A1* | 12/2019 | Thielmann | .......... | E05D 11/0054 |
| 2020/0232266 A1* | 7/2020 | Qi | ........................ | A47B 88/473 |

FOREIGN PATENT DOCUMENTS

| | | | | |
|---|---|---|---|---|
| EP | 0344785 | A2 | 12/1989 | |
| EP | 3059529 | A1 * | 8/2016 | ............ E05D 15/00 |
| JP | H06272447 | A | 9/1994 | |
| JP | 2009139020 | A * | 6/2009 | ............ F24C 15/023 |

* cited by examiner

DAMPING UNIT AND HOME APPLIANCE WITH THE DAMPING UNIT

CROSS-REFERENCE TO RELATED APPLICATION

This application claims the priority, under 35 U.S.C. § 119, of Turkish application TR 2018/15157, filed Oct. 12, 2018; the prior application is herewith incorporated by reference in its entirety.

BACKGROUND OF THE INVENTION

Field of the Invention

The invention relates to a damping unit for damping a movable element of a home appliance, particularly a cooling device, for example a household refrigerator.

A damper, in other terms a shock-absorber, is usually used to damp, in other terms to slow down or to absorb kinetic energy of a movable element.

German published patent publication DE 10 2015 013 422 discloses a damping element, in particular a closing damper, comprising a housing, a plunger, which is mounted reciprocally in the housing along a movement axis, and a damping unit, which in the housing is supported and cooperates with the plunger to damp a direction of movement of the plunger. The damping element is characterized in that the housing is designed such that it comprises receptacles for at least two damping units cooperating with the plunger.

The invention provides an additional improvement, an additional advantage or an alternative to the prior art.

BRIEF SUMMARY OF THE INVENTION

The purpose of the invention is providing a damping unit providing an effective final slow down and/or a slow stop of a movable element of a home appliance; and a home appliance having the damping unit.

The invention, to achieve the abovementioned purpose, is a damping unit for damping a movable element of a home appliance comprising at least two dampers positioned in a housing, characterized in that the dampers are positioned side-by-side to guarantee a defined series of damping the energy of the movable element. Thus, the movable element is damped by a first damper to lose some of its energy; and then the rest of the dampers slows down the movable element, or even stop it, with an effective and reasonable speed and/or energy.

The dampers may be any damper type known in the prior art. For instance, it may be a fluid damper and/or a hydraulic damper.

In this context, "damping" means including end of damping and/or the continuing process of damping. The next damper may start damping after the previous one finishes, or during the previous damper is still damping.

The household appliance is in particular provided for storing and preferably tempering victuals such as beverages, wine, meat, fish, vegetables, fruits, milk and/or dairy products in at least one operating state, advantageously for the purpose of enhancing a keepability of the stored victuals. However, the home appliance could also be embodied as a home appliance for warming and in particular for cooking victuals such as an oven, a cooker and/or a microwave. Advantageously, the home appliance is embodied as a home chiller appliance, which is in at least one operating state configured for cooling victuals. The home chiller appliance could in particular be embodied as a climate cabinet, an ice-box, a refrigerator, a freezer, a refrigerator-freezer combination and/or a wine cooler. It may have one or more doors, including French-Door appliances. However, the home appliance could also be embodied as a home appliance for storing items without any cooling function. The home appliance may also be any washing appliance like laundry washing machine or dishwasher machine both having a movable door or other elements. On the other hand, any other home appliance having a movable element may be an appliance for which the invention is used.

The movable element may be a door of the home appliance. The door may have an angle between the carcass of the home appliance on that the door is attached and the door itself at the first contact moment with the first damper. That angle may be 15 degree or less, particularly for doors having a hinge assisting the closure of the door by an element, for instance a spring.

In a possible embodiment of the invention, a distance between contact points of the neighboring dampers for the movable element is 14-50 mm, particularly 20-30 mm, more particularly 25-27 mm, specifically 26.5 mm along a line substantially vertical to the damping direction. Thus, effective series of damping may be achieved. Additionally, such a distance provides ability to produce, transport and locate the dampers together without need of additional workload, transportation and cost.

The "contact point" means any point on the related part/element where any other part/element that is directly or indirectly connected to the movable element to transfer the damping effect of the dampers touches firstly the related part/element having the contact point.

In a possible embodiment of the invention, distance between contact points of the neighboring dampers for the movable element may be substantially half of the stroke length of the longer damper of the neighboring dampers along the damping direction. Thus, any movable element or any part/element directly or indirectly connected to the movable element as enable to transfer the damping effect to the movable element, which is moving along a direction being substantially parallel to the damping direction of the dampers, may be damped with a series damping.

In a possible embodiment of the invention, the damping unit may have an individual piston for each of the dampers located between the damper and the movable element for contacting the movable element. Thus, the dampers may be protected against hit of the movable element, particularly the movable elements being heavy and/or hitting possibly heavily.

For the pistons with the same width, same diameter for the circular or cylindrical pistons, the distance between the center lines of the pistons may be 14-50 mm, particularly 20-30 mm, more particularly 25-27 mm, specifically 26.5 mm along a line substantially vertical to the damping direction and/or the center line of the pistons.

In a possible embodiment of the invention, the piston may have a detachable connection with the housing, particularly in a form-fit manner. Thus, a facilitated connection may be provided for the piston and the housing. Additionally, the fixing or replacement of a damper is possible and is facilitated. That also leads possibility of using different dampers on the same damping unit in case of different necessities of each home appliance. Although the desired "detachable" connection is non-destructively detachable manner, in another possible embodiment, the piston may be detached with a destructive manner. Then the piston may be replaced with a new piston.

In a possible embodiment of the invention, the damping unit may have a guide on at least one of the piston and the housing and a slider on at least one of the piston and the housing being slidable in the corresponding guide to guide the piston. In a possible embodiment of the invention, the slider may be limited in the guide to move only along a line substantially parallel to the damping direction. Thus, although a possible movable element contacts to the dampers with an angular orientation, the pistons and the dampers may absorb the shock in the damping direction of the dampers. Additionally, possible rotation of the piston around its own central axis may be avoided.

The guide may be in form of a recess extending along the damping direction. It may have form-fit detail inside providing a stopper wall for the slider extending substantially vertical to the damping direction. In a possible embodiment, the stopper wall may be provided by forming a hole in the guide; and a wall defining the hole and extending substantially vertical to the damping direction may be the stopper wall. To provide more reliable form-fit connection, it is preferable to have more than 90 degrees.

By the guide-slider relation, the piston only slides on working direction of dampers for better soft closing performance and lifetime. Designed guide-slider relation enhances performance of transformation of a possible angular motion of the movable element to linear motion. Because of rigid mechanism, transformation of lateral load to working direction of the damper is assured. That is diminishing bending risks of damper. Additionally, the guide-slider relation prohibits swivel of the damper and the piston. With that feature, stabilization of the damper unit is stimulated.

In a possible embodiment of the invention, the slider and/or the guide may be configured to limit the movement of the slider along a desired stroke length. Thus, due to the pre-determined length of the piston, although the same stroke length exists, different behaviors may be obtained by using dampers with different characteristics and/or force capabilities.

In a possible embodiment of the invention, the housing may have a locating detail compatible to form of a location of the housing to ensure the correction of order of the dampers. Thus, in a possible embodiment with dampers having different damping characteristics and/or types, the correct orientation and/or order of the dampers may be assured.

In a possible embodiment of the invention, the damping unit may have a sleeve to locate the housing inside to detachably fix the housing. Thus, the damping unit may be replaced with a new and/or different one in a facilitated manner. The sleeve may be integral to any part of the home appliance or may be an individual part that may be fixed on a location where the damping unit is intended to be positioned. Although the desired "detachable" connection is non-destructively detachable manner, in another possible embodiment, the housing may be detached with a destructive manner. Then the housing may be replaced with a new housing.

In a possible embodiment of the invention, the dampers may have different damping characteristics. Thus, the purpose of the invention may be achieved for different type of home appliances or movable elements. The characteristic of the dampers may be linear and/or non-linear.

In a possible embodiment of the invention, the damping unit may have the first damper having a non-linear damping characteristics starting to damp the movable element first; and has the second damper having a linear damping characteristics starting to damp the movable element after start of the first damper.

In another possible embodiment of the invention, the damping unit may have the first damper having a linear damping characteristics starting to damp the movable element first; and has the second damper having a non-linear damping characteristics starting to damp the movable element after start of the first damper.

In the contexts disclosed previously, "after start of the first damper" means that the second damper may start to damp the movable element during the first damper is still damping the movable element, or after the first damper finishes its damping process. For instance, after contacting to first damper, the movable element will lose a fair amount of kinetic energy thereof and slows down. Then beside the first one, the second damper gets in contact with the door and the door reaches expected closing speed. By this mechanism, closing speed of the door may be reduced gradually.

For a damping unit having two dampers for particularly a heavy movable element:
  If the both dampers have linear damping characteristics (L-L), the endurance of the dampers decreases for long term working conditions, especially for heavy movable elements like heavy doors of the home appliances.
  If the both dampers have non-linear damping characteristics (N-N), the damping unit provides a low performance due to decreasing damping effect of the non-linear dampers after the first hit to the dampers.
  If the first contacting damper is a non-linear one and the second contacting damper is a linear one (N-L), then an observable and effective slow down on the movable element is obtainable. This especially avoids a heavy hit of the movable element to a corresponding part of the home appliance. For example, hit of the door of a refrigerator to the carcass of the refrigerator.
  If the first contacting damper is a linear one and the second contacting damper is a non-linear one (L-N), still a reasonably acceptable damping effect may be achieved, although it is less effective than the N-L damper orientation.

In a possible embodiment of the invention, the dampers may have the same damping characteristics. In a possible embodiment of the invention, the dampers may be identical. Thus, especially for not-heavy movable elements, it may still provide a damping unit according to the purpose of the invention.

In a possible embodiment of the invention, the damping unit may be located on the home appliance and/or a vicinity of the home appliance. Thus, a home appliance may be produced directly having the damping unit, or the damping unit may be used for any home appliance still after its production.

By the term "form-fit", it is in particular to be understood preferably releasable connected, wherein a holding force between two structural components is preferably transferred via a geometric engagement of the structural components with each other.

Any place where the home appliance is located may be a location to attach the damping unit. For instance a furniture in that a built-in appliance or a free-standing appliance is located may accommodate the damping unit as being enable to damp the movable element of the appliance directly or indirectly. If an external element, like a furniture feature, is attached and/or fixed to the movable element of the home appliance directly or indirectly, the damping of that external element is also mean to damp the home appliance and included in the scope of the invention.

The home appliance could in particular be embodied as a climate cabinet, an ice-box, a refrigerator, a freezer, a refrigerator-freezer combination and/or a wine cooler. However, the home appliance could also be embodied as a home appliance for storing items without any cooling function.

The door may be attached to the chamber as rotatable around a pivot or as slidable toward or away from the chamber. For instance, the door may be hinged to the chamber. In another embodiment, the door may be attached to the chamber by a rail as slidable. The rail may be a telescopic rail or any rail system known as used on a cooling device for such a door.

In any context disclosed previously, "substantially vertical" is in particular to be understood as an orientation of a direction with respect to a reference direction, in particular in a plane, wherein the direction and the reference direction include an angle of 90°, the orientation in particular having a deviation of less than 15°, advantageously of less than 10° and particularly advantageously of less than 2°.

In any context disclosed previously, "substantially parallel" is in particular to be understood as an orientation of a direction with respect to a reference direction, in particular in a plane, wherein the direction and the reference direction include an angle of 0°, the orientation in particular having a deviation of less than 15°, advantageously of less than 10° and particularly advantageously of less than 2°.

Further advantages may become apparent from the following description of the drawing. In the drawing an exemplary embodiment of the invention is shown. The drawing, the description and the claims contain a plurality of features in combination. The person having ordinary skill in the art will purposefully also consider the features separately and will find further expedient combinations.

If there is more than one specimen of a certain object, only one of these is given a reference numeral in the figures and in the description. The description of this specimen may be correspondingly transferred to the other specimens of the object.

DETAILED DESCRIPTION OF THE INVENTION

Figure 1:
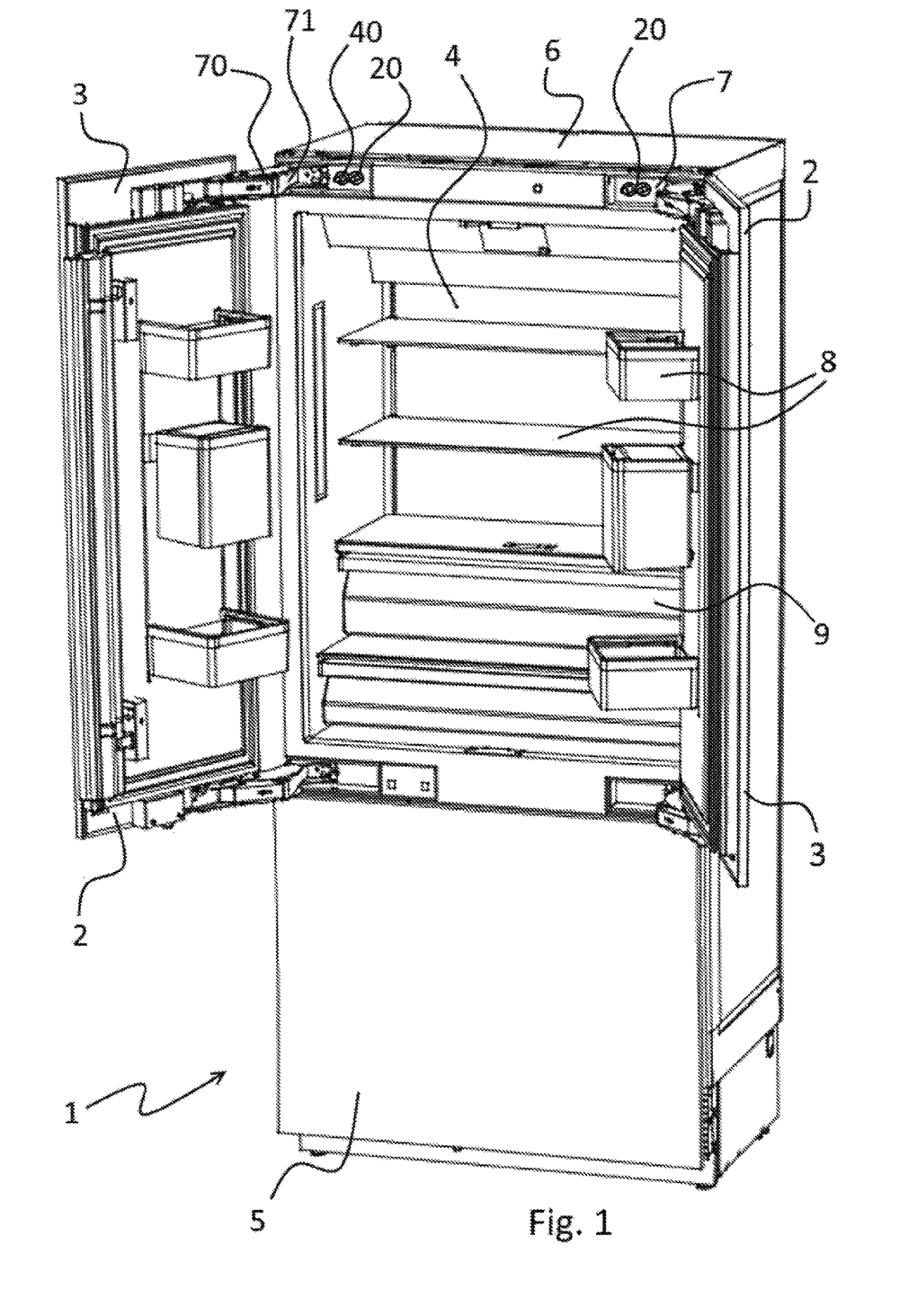
FIG. 1 represents the possible home appliance that is a fridge-freezer combination device having a damping unit.

Referring now to the figures of the drawing in detail and first, particularly, to FIG. 1 thereof, there is shown a household fridge-freezer combination device—refrigerator, for short—representing a home appliance (1). The refrigerator has two hinged doors (3) that are together covering a fridge chamber (4). The refrigerator has also a bottom door (5) to cover a freezer chamber. The fridge chamber (4) has a number of trays (8) and drawers (9) to carry and/or store items in the refrigerator. There are also a number of trays (8) on the doors (3).

The body (6) of the refrigerator has hinge housings (7) for both hinges (70) of the both doors (3). The hinge housings (7) accommodate the hinges (70) at least partly, when the doors (3) are closed.

Figure 2:
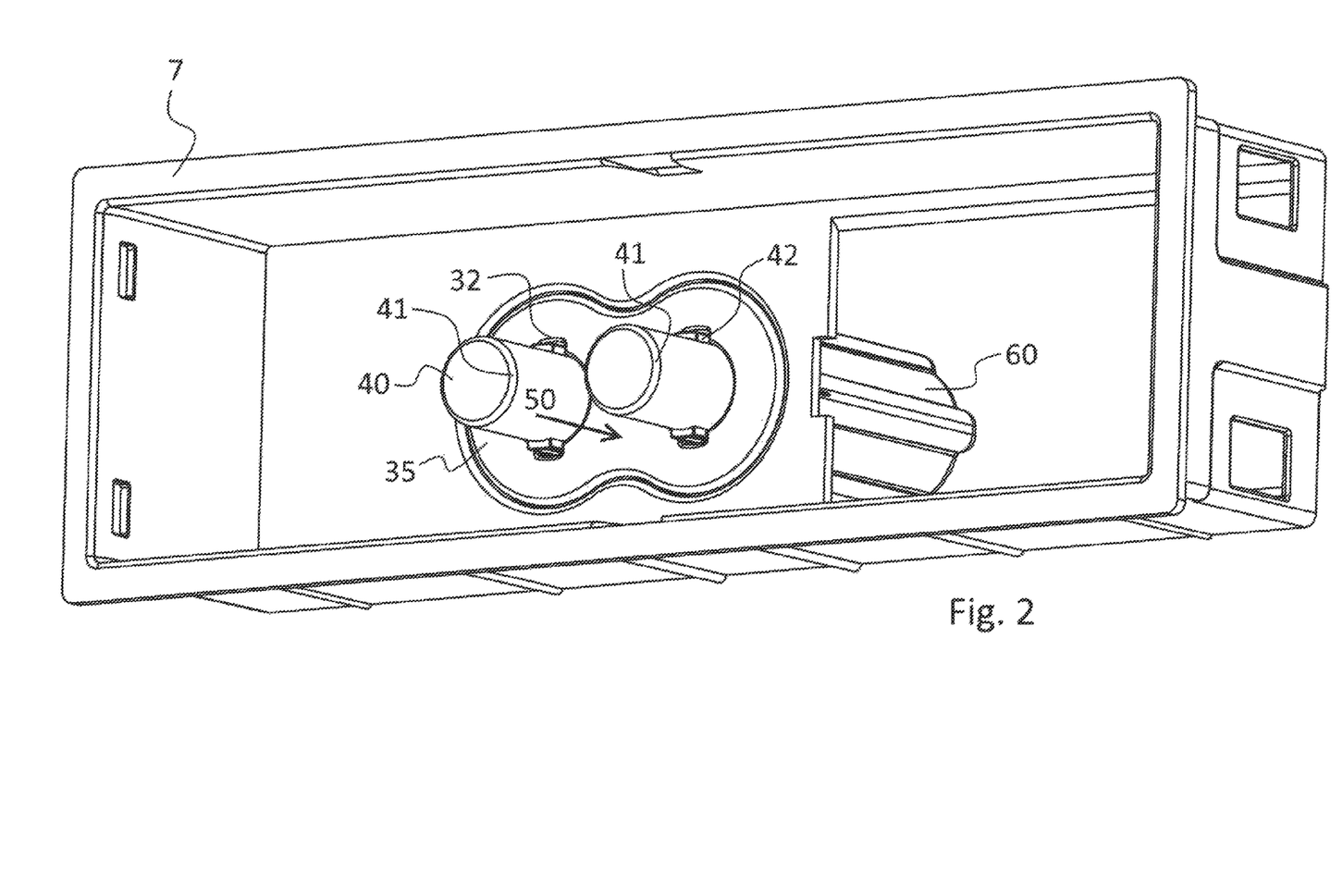
FIG. 2 represents the possible damping unit located in a hinge housing of the home appliance of FIG. 1.
Figure 4:
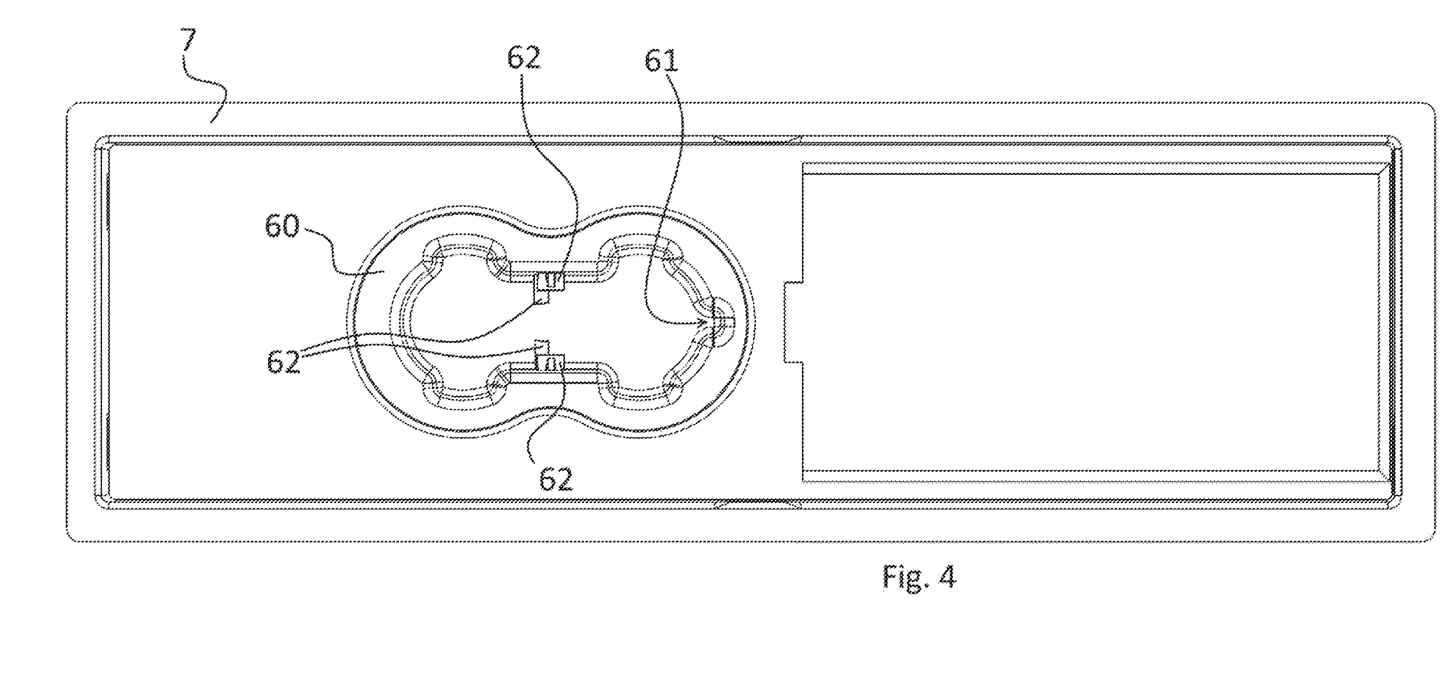
FIG. 4 represents the possible hinge housing with the sleeve of the damping unit.

In FIG. 2, a damping unit (20) is embedded into the hinge housing (7) to damp the hinge (70) directly, and thus to indirectly dump the door (3) as the movable element (2). The hinge housing (7) is a plastic part that has an integrally obtained sleeve (60) for the damping unit (20). The sleeve (60) provides a closed volume for the housing (30) in a wall of the body (6) that contains insulation foam. The sleeve (60) is only open on a vertical wall of the hinge housing (7) facing the hinge (70), when the door (3) is closed as in FIG. 2 and FIG. 4.

Figure 5:
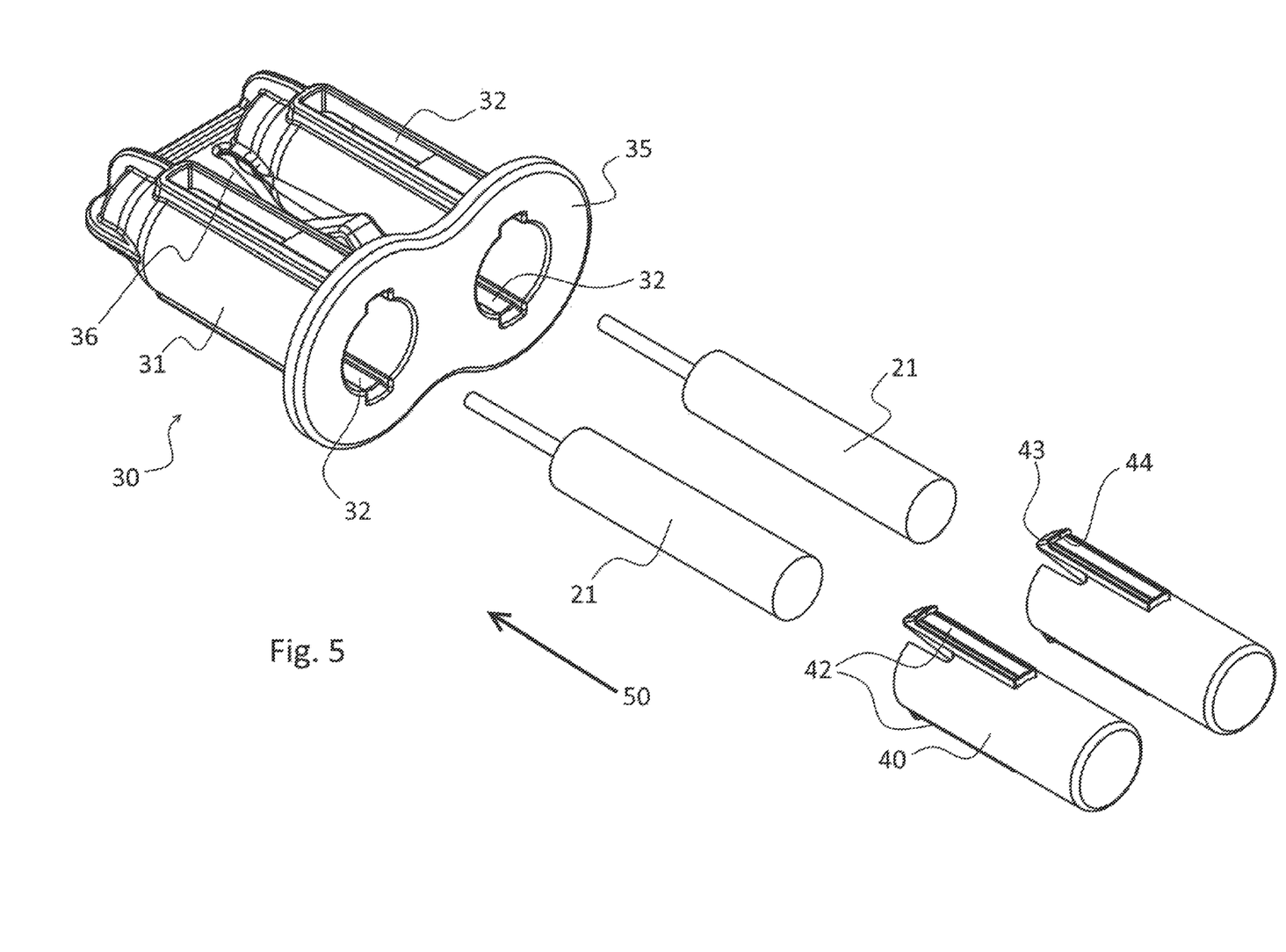
FIG. 5 represents the damping unit housing of FIG. 3 as disassembled.

As in FIG. 5, the damping unit (20) contains two dampers (21). Each damper (21) is limited between a piston (40) and a chamber (31) provided on a housing (30) for the damper (21), exemplified in FIG. 5. The housing (30) has two chambers (31) for two dampers (21). The chambers (31) are positioned as side-by-side. The dampers (21) is positioned in the chambers (31) by passing through openings provided on a flange (35) of the housing (30). The flange (35) sits inside a corresponding recess on the sleeve (60), so that a face of the flange (35) facing the movable element (2) is flush with the face of the wall of the hinge housing (7) on that the sleeve (60) exists. After the dampers (21) are located, the piston (40) of related damper (21) is penetrated into the housing (30) through the same opening on the flange (35). The piston (40) has two sliders (42) formed as an elongated embossment on the lateral face of the piston (40) and having a form-fit tab (43) at its free end extending toward to the housing (30). The two sliders (42) of a piston (40) are located as facing each other. Corresponding to the sliders (42), the housing (30) has two guides (32) for each chamber (31) thereof. The guide (32) is a recess on the inner lateral face of the chamber (31). The guides (32) of one chamber (31) face each other. The guide (32) starts from the opening on the flange (35), thus the slider (42) can penetrate into the guide (32). The guide (32) has two sections. The first section is close section to the flange (35). The first section is in a recess form on the chamber (31). Yet, the second section away from the flange (35) is in form of a hole. The form-fit tab (43) of the slider (42) slides in the first section of the guide (32) as bended form; and then it comes to its initial position when it is reached to the second section of the guide (32). To achieve this, the tab (43) has an inclined face contacting the flange (35) first. When the user continue to push the piston (40) inside the chamber (31), the slider (42) is bent and allows the piston (40) to enter the chamber (31). The tab (43) has a leaning wall (44) substantially vertical to a line parallel to the damping direction (50) and it leans to a stopper wall (33) formed by the hole on the guide (32) due to pushing force of the compressed damper (21) as in FIG. 6. The stopper wall (33) especially extends with an angle greater than 90 degree between the face of the stopper wall (33) and a line parallel to the damping direction (50). The leaning wall (44) also corresponds has an angle corresponding to the angle of the stopper wall (33).

Figure 6:
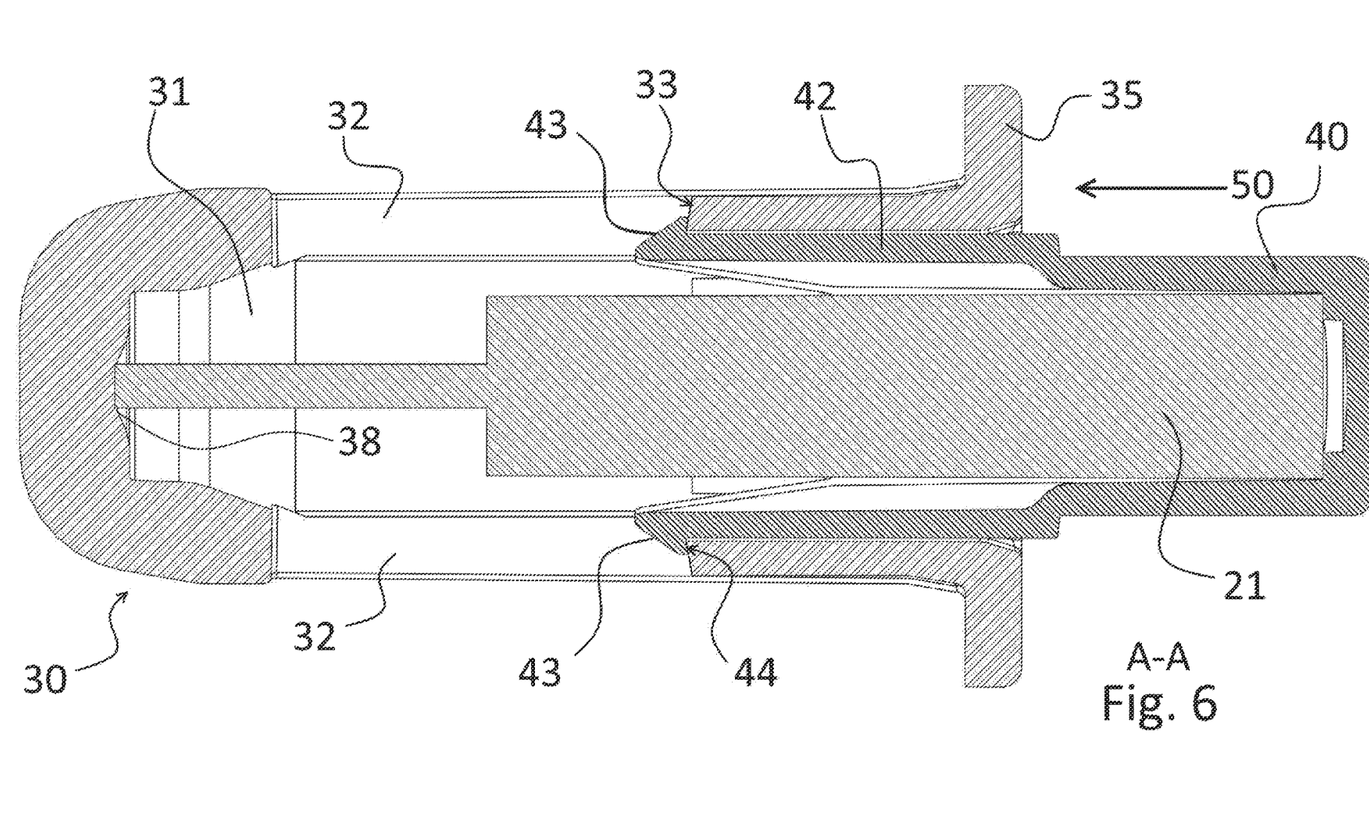
FIG. 6 represents the sectional view A-A from FIG. 3.
Figure 8:
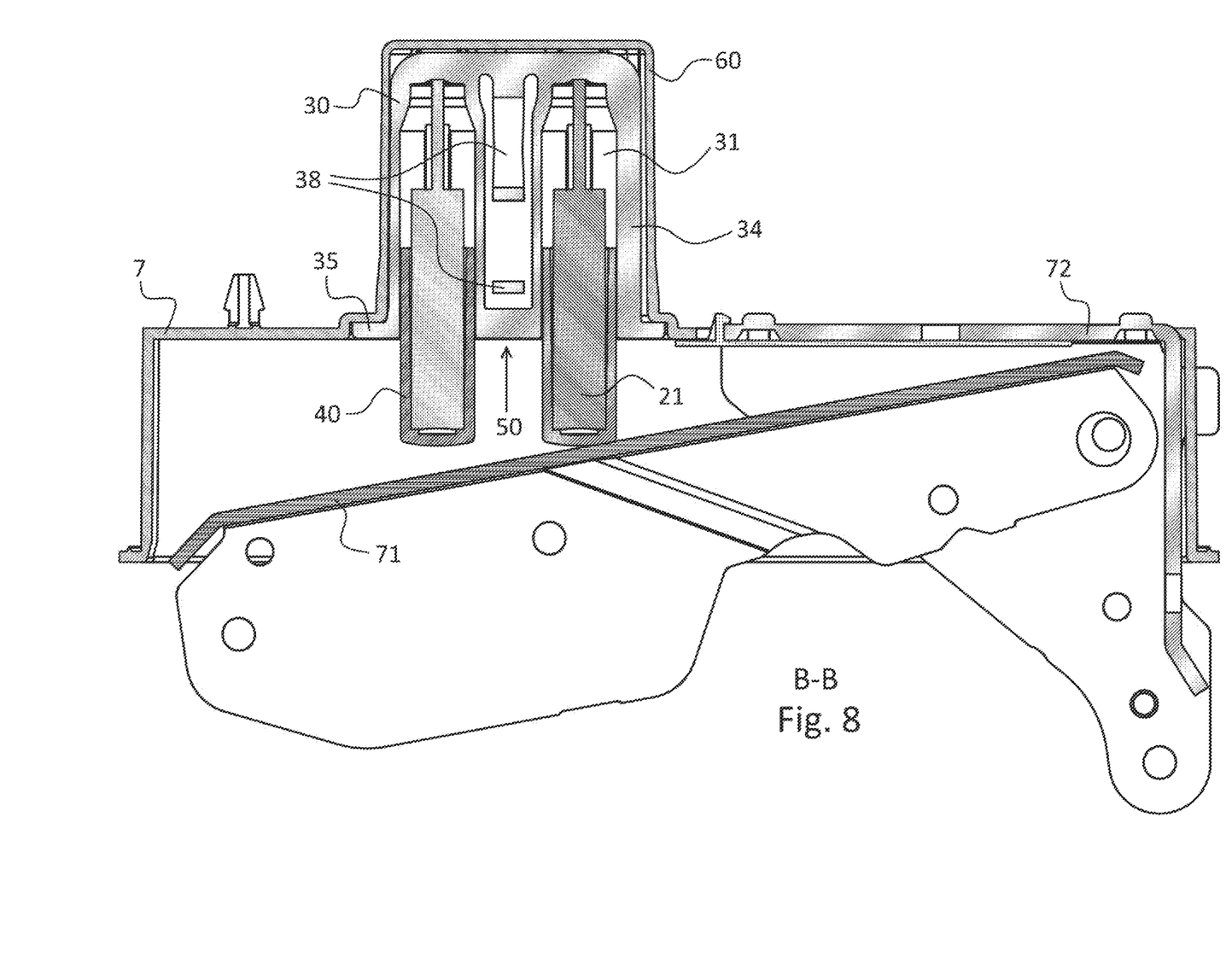
FIG. 8 represents the sectional view B-B from FIG. 7.
Figure 9:
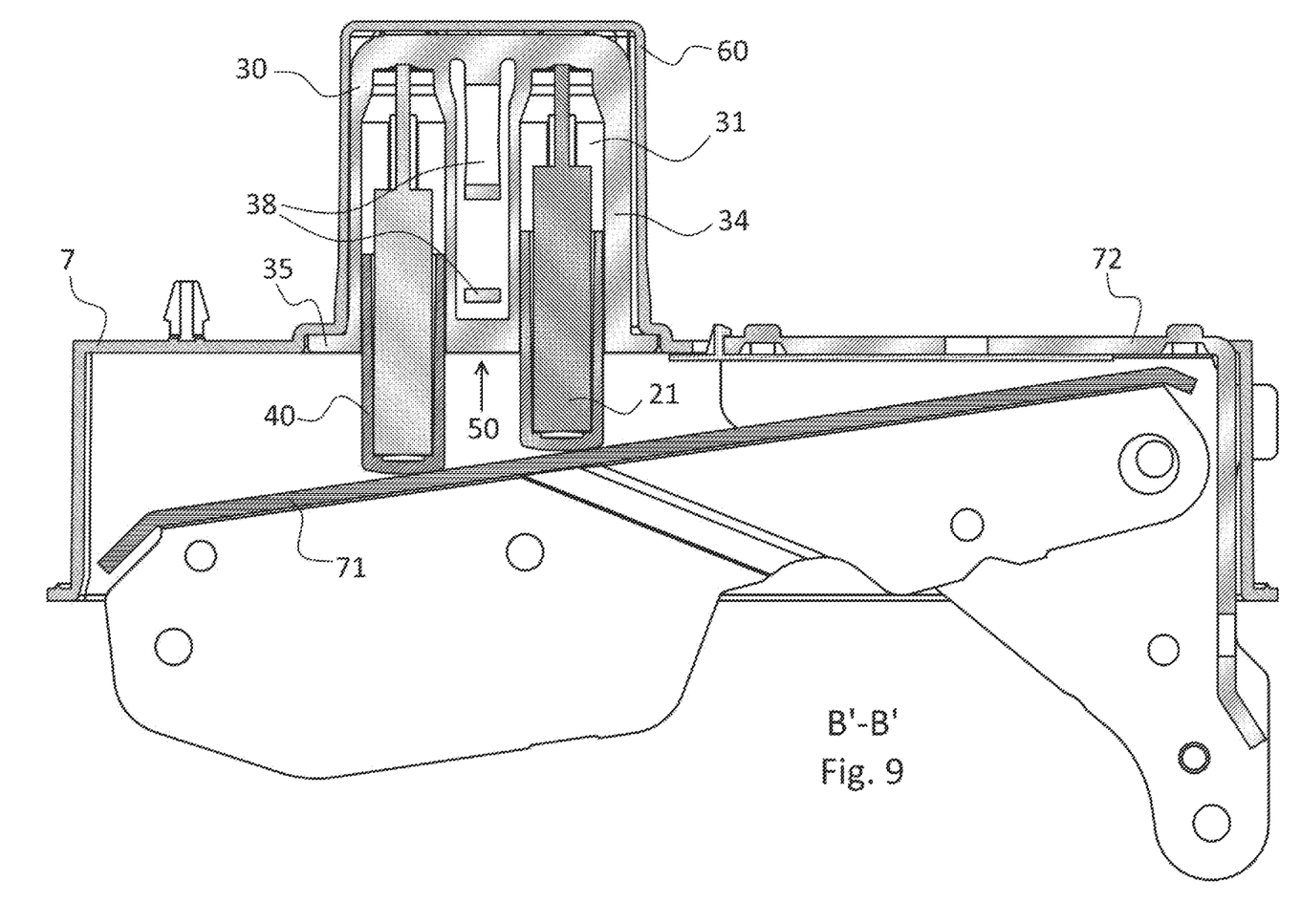
FIG. 9 represents the sectional view B'-B' showing that the arm contacts to the second damper in the series of the dampers.

Although in FIGS. 6, 8 and 9, the dampers (21) are shown as a single piece body, it is realized for simplicity of the drawings. The dampers (21) have in reality a cylindrical receptacle for fluid inside and an elongated rod extending out of the receptacle with a piston head at the end thereof inside the receptacle to pressurize the fluid or being pushed by the pressurized fluid. In figures, the larger section of the damper (21) placed in the piston (40) is the receptacle; and the thin section is the rod. The chamber (31) of the housing (30) has a seat (38) on the far inner wall compared to the flange (35) for the free end of the rod to provide stable functioning.

The dampers (21) of the damping unit (20) are hydraulic dampers. However, their damping characteristics may vary. In the example embodiment, the damper (21) on that the hinge (70) contacts first during the door closing has non-linear damping characteristics. The other damper (21), on the other hand, has linear damping characteristics.

Figure 3:
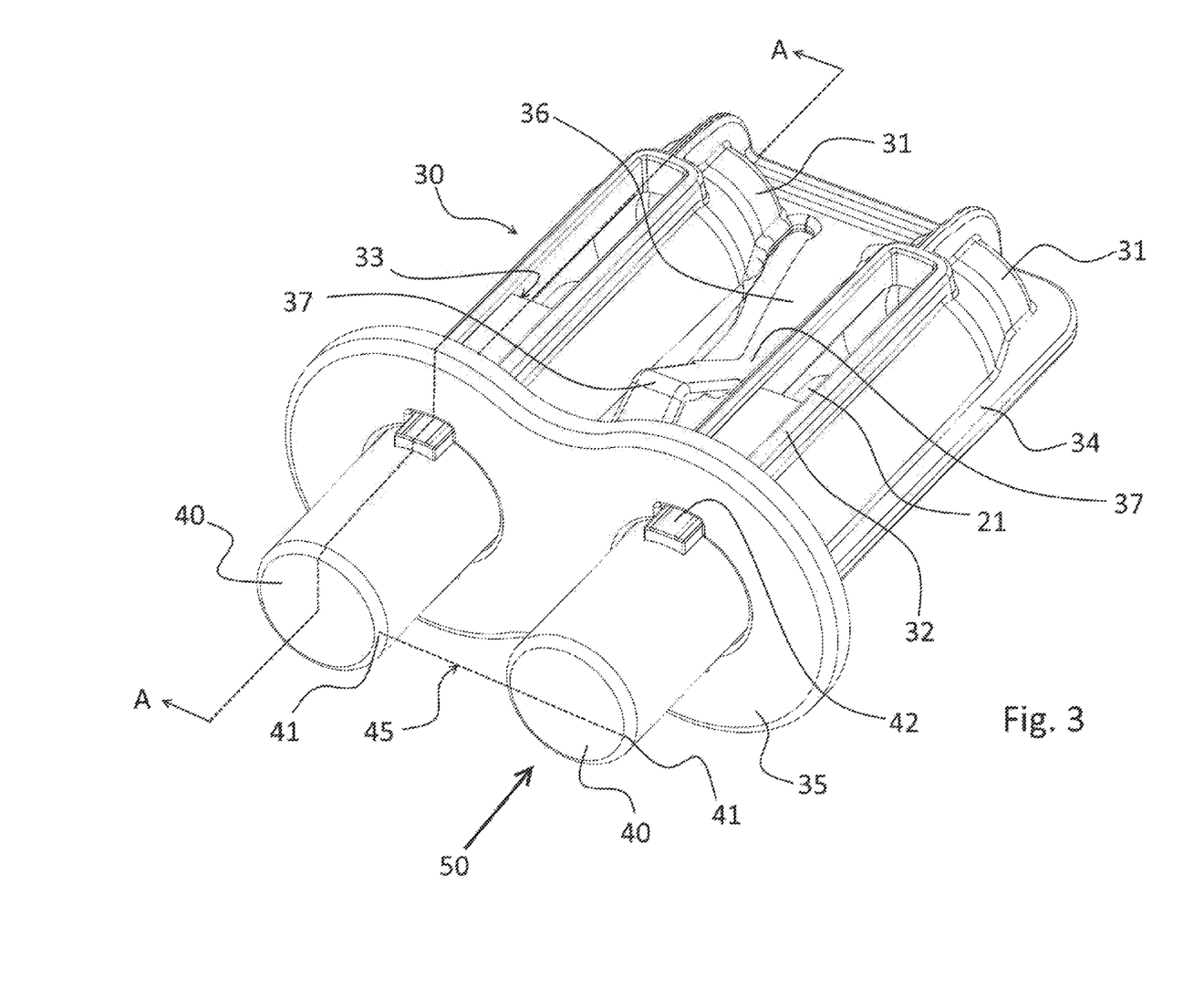
FIG. 3 represents the possible housing of the damping unit of previous figures including the dampers and the pistons.

The housing (30) is located inside the sleeve (60) in a detachable manner. When the dampers (21) have different damping characteristics, the orientation of the housing (30) prepared before as carrying the dampers (21) and the pistons (40) is important. To avoid having wrong orientation, the housing (30) has a locating detail (34) that is a flange-like plate protrusion extending along a line parallel to the damping direction (50) as in FIG. 3. The sleeve (60) has a locating recess (61) on its inner lateral wall as corresponding to the locating detail (34) of the housing (30) as in FIG. 4. Thus, any person locating the housing (30) inside the sleeve (60) is guided to achieve correct orientation.

The housing (30) has a connector (36) with two engagement points (37). The connector (36) is a waveform rod extending from a rear frame connecting the rear ends of the two chambers (31) towards front of the housing (30), meaning along a line parallel to the damping direction (50). The waveform has a peak as the first engagement point (37) and a trough as the second engagement point (37). Since the far end of the connector (36) compared to the rear frame is free, the connector (36) is flexible. The flexibility is also reason of that the housing (30) is made of plastic. The sleeve (60) has two counterparts (62) on its inner face. The counterparts (62) correspond to the engagement points (37) of the connector (36). Due to flexibility of the connector (36) and inclined faces of the engagement points (37) and the counterparts (62), the housing (30) can be pushed into the sleeve (60) and can be pulled out of the sleeve (60) after being subjected to enough amount of force in corresponding direction. Due to mentioned features, a form-fit, specifically a snap-fit connection is obtained in both direction. The counterparts (62) are substantially triangle shape protrusions. The edge of the counterparts (62) facing the engagement points (37) during the assembly of the housing (30) has a narrower angle compared to the edge facing the engagement points (37) during the disassembly of the housing (30). Thus, assembly is easier than the disassembly to avoid possible undesired disassembly.

Figure 7:
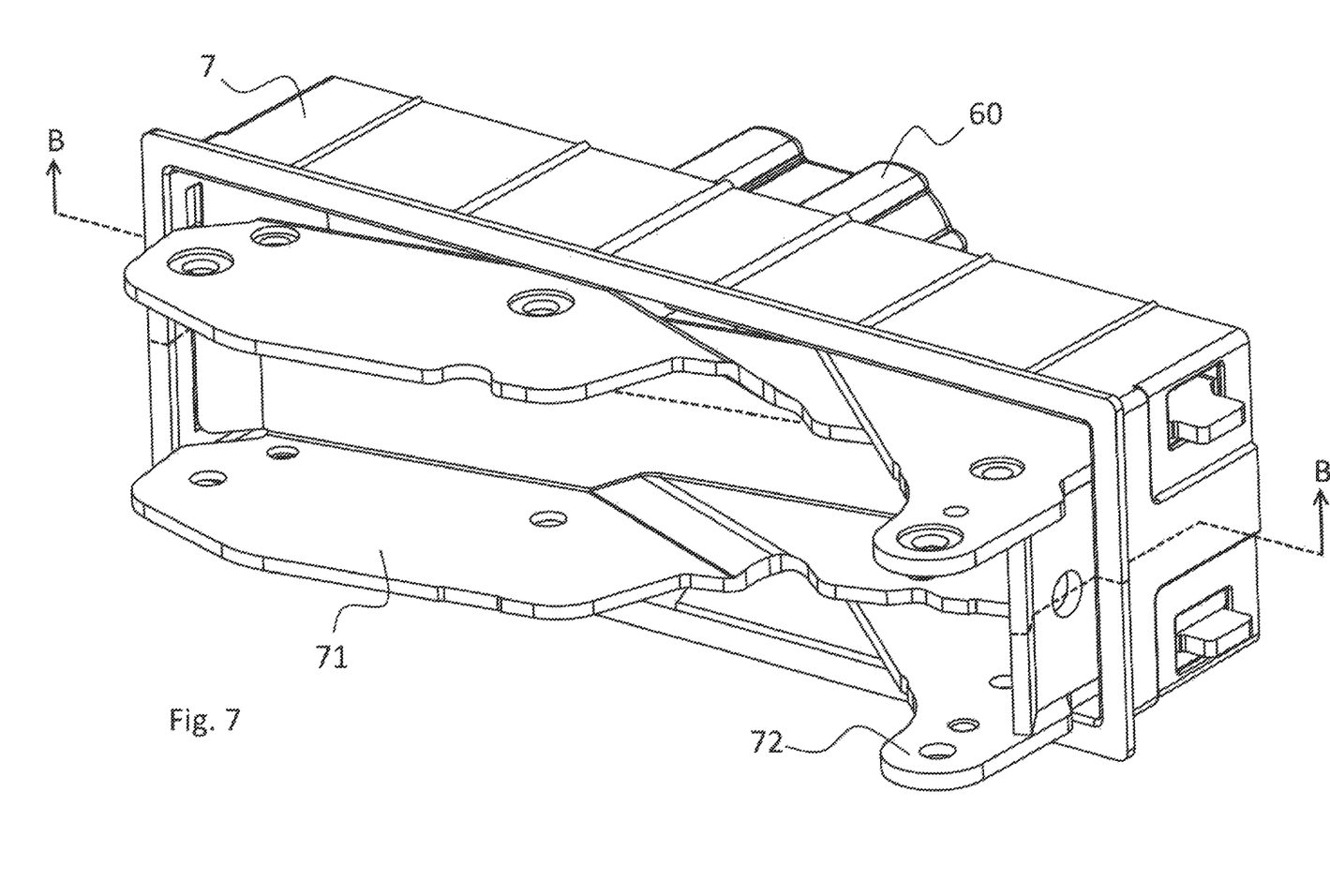
FIG. 7 represents the hinge housing, the hinge bracket and the hinge arm that directly contacts to the damping unit in position where the arm contacts the first damper in series of dampers.

When, as in FIGS. 7 and 8, the door (3) is being closed, a hinge arm (71) of the hinge (70) that is connected to the body (6) by a hinge bracket (72) contacts the first damper (21). On the example appliance (1), the hinge (70) of the door (3) has its own spring to provide self-closing after the door (3) is reached about 15-degree angle between the door (3) and the body (6). The first damper (21) having non-linear damping characteristics damps the hinge (70) and so the door (3) firstly. The first damper (21) absorbs the kinetic energy of the door (3) at the beginning of its stroke and slows down the door (3) to a certain speed. Due to non-linear characteristics, the damping effect of the damper (21) decreases and the speed of the door (3) starts to increase. Then, as in FIG. 9, the hinge (70) and so the door (3) contacts to the second damper (21) that has linear damping characteristics. Due to linear characteristics, the speed of the door (3) is kept constant. As a result, the door (3) is closed with a reasonable speed without an unwanted hit to the body (6). The distance (45) between the contact point (41) of the first piston (40) and the contact point (41) of the second piston (40), where the hinge arm (71) first touch them, is about 26.5 mm.

The following is a list of reference numerals appearing in the drawing figures and in the above description:
1 Home appliance
2 Movable element
3 Door
4 Fridge chamber
5 Bottom door
6 Body
7 Hinge housing
8 Tray
9 Drawer
20 Damping unit
21 Damper
30 Housing
31 Chamber
32 Guide
33 Stopper wall
34 Locating detail
35 Flange
36 Connector
37 Engagement point
38 Seat
40 Piston
41 Contact point
42 Slider
43 Tab
44 Leaning wall
45 Distance
50 Damping direction
60 Sleeve
61 Locating recess
62 Counterpart
70 Hinge
71 Arm
72 Bracket

The invention claimed is:

1. A damping unit for damping a movable element of a home appliance, the damping unit comprising:
   at least two dampers disposed in a housing;
   said at least two dampers being positioned side-by-side to guarantee a defined series of damping an energy of the movable element; and
   an individual piston for each of said at least two dampers located between the damper and the movable element for contacting the movable element;
   a guide on said housing, and a slider on said piston being slidable in the corresponding guide to guide said piston.

2. The damping unit according to claim 1, wherein a distance between contact points of neighboring said dampers for the movable element is 14-50 mm along a line substantially vertical to a damping direction.

3. The damping unit according to claim 2, wherein the distance between the contact points is 20-30 mm.

4. The damping unit according to claim 2, wherein the distance between the contact points is 25-27 mm.

5. The damping unit according to claim 2, wherein the distance between the contact points is 26.5 mm.

6. The damping unit according to claim 1, wherein a distance between contact points of neighboring said dampers for the movable element is substantially half of a stroke length of a longer damper of the neighboring said dampers along a damping direction.

7. The damping unit according to claim 1, wherein said piston has a detachable connection with said housing.

8. The damping unit according to claim 7, wherein said connection is a form-fit connection.

9. The damping unit according to claim 1, wherein said slider is limited in the guide to move only along a line substantially parallel to the damping direction.

10. The damping unit according to claim 1, wherein at least one of said slider or said guide is configured to limit a movement of said slider along a stroke length.

11. The damping unit according to claim 1, wherein said housing of the damping unit has a locating detail configured to form of a location of the housing to ensure a correction of order of said at least two dampers.

12. The damping unit according to claim 1, further comprising a sleeve, said housing of the damping unit being detachably fixed inside of said sleeve.

13. The damping unit according to claim 1, wherein said at least two dampers have different damping characteristics.

14. The damping unit according to claim 1, wherein said at least two dampers include a first damper having a non-linear damping characteristic starting to damp the movable element first, and a second damper having a linear damping characteristics starting to damp the movable element after start of said first damper.

15. The damping unit according to claim 1, wherein said at least two dampers include first damper having a linear damping characteristic starting to damp the movable element first, and a second damper having a non-linear damping characteristics starting to damp the movable element after start of the first damper.

16. The damping unit according to claim 1, wherein said at least two dampers have identical damping characteristics.

17. A home appliance, comprising a damping unit according to claim 1.

18. A damping unit for damping a movable element of a home appliance, the damping unit comprising:
   at least two dampers disposed in a housing;
   said at least two dampers being positioned side-by-side to guarantee a defined series of damping an energy of the movable element; and
   a sleeve, said housing of the damping unit being detachably fixed inside of said sleeve.

19. A damping unit for damping a movable element of a home appliance, the damping unit comprising:
   at least two dampers disposed in a housing;
   said at least two dampers being positioned side-by-side to guarantee a defined series of damping an energy of the movable element; and
   an individual piston for each of said at least two dampers located between the damper and the movable element for contacting the movable element;
   a guide on said piston, and a slider on said housing being slidable in the corresponding guide to guide said piston.

* * * * *